United States Patent
Nogarede

[11] Patent Number: 5,493,164
[45] Date of Patent: Feb. 20, 1996

[54] SURFACE ACOUSTIC WAVE MOTOR

[75] Inventor: Bertrand Nogarede, Toulouse, France

[73] Assignee: Crouzet Automatismes S.A., Valence, France

[21] Appl. No.: 277,867

[22] Filed: Jul. 20, 1994

[30] Foreign Application Priority Data

Jul. 30, 1993 [FR] France ................ 93 09570

[51] Int. Cl.[6] ............................ H01L 41/08
[52] U.S. Cl. ............... 310/323; 310/313 R; 310/317
[58] Field of Search ................ 310/313 R, 323, 310/316, 317

[56] References Cited

U.S. PATENT DOCUMENTS

| | | | |
|---|---|---|---|
| 4,019,073 | 4/1977 | Vishnevsky et al. | 310/323 |
| 4,144,519 | 3/1979 | Chamuel | 340/16 R |
| 4,562,374 | 12/1985 | Sashida | 310/328 |
| 4,634,916 | 1/1987 | Okada et al. | 310/323 |
| 5,062,622 | 11/1991 | Kataoka et al. | 310/323 |
| 5,149,080 | 9/1992 | Yamamoto | 310/323 |

FOREIGN PATENT DOCUMENTS

| | | | |
|---|---|---|---|
| 63-018975 | 1/1988 | Japan | H02N 2/00 |
| 1214271 | 8/1989 | Japan | H02N 2/00 |
| 0214271 | 8/1989 | Japan | 310/323 |
| 2111269 | 4/1990 | Japan | H02N 2/00 |
| 0573828 | 9/1977 | U.S.S.R. | 310/323 |

Primary Examiner—Thomas M. Dougherty
Attorney, Agent, or Firm—Lowe, Price, LeBlanc & Becker

[57] ABSTRACT

A motor includes two parts that are mobile one with respect to the other and have facing surfaces contacting each other. Progressive surface acoustic waves of the same direction are produced in each facing surface of each part. The relative speed or position of the parts is adjusted by acting on the relative frequency or phase of the progressive waves.

7 Claims, 4 Drawing Sheets

SURFACE ACOUSTIC WAVE MOTOR

BACKGROUND OF THE INVENTION

1. Field of the Invention

The present invention relates to surface acoustic wave motors.

2. Discussion of the Related Art

Surface acoustic wave motors are described, for example, in U.S. Pat. No. 4,562,374 by T. Sashida. The working principle of such a motor is illustrated in FIG. 1 of the Sashida patent, reproduced in the attached FIG. 1. A progressive surface wave of the Rayleigh type produced at the surface of a fixed elastic body 1 causes ripples at the surface of the body. If a mobile part 2 is pressed against body 1, part 2 is driven by the displacement of apexes A-A' of these ripples. Apexes A-A' run along an elliptic path Q and their transverse displacement speed is associated with the oscillation frequency and the amplitude of their displacement. In practice, the excitation frequency of the surface waves must be close to a resonance frequency of the body at the surface of which it is desired to produce these waves and this frequency can be modified only within a small range if it is desired to maintain a non-negligible amplitude (for example, approximately 10 μm) of the apexes of the ripples. A slight frequency mismatch with respect to the resonance frequency causes a major amplitude variation. Thus, the relation between the speed of movement in the direction of arrow N of apexes A and A' and the excitation frequency is a complex non-linear relation.

The surface acoustic wave motor of U.S. Pat. No. 4,562,374 has the advantages of being very little noisy (since the frequency of the excitation signal is within a non-audible range, for example, 20 to 100 kHz), relatively performing, small-sized and light for a determined torque, and of having a high hold torque (that is, when no signal is applied, the mobile part 2 is applied against the fixed part 1 and a non-negligible friction force is present between both parts).

However, the drawback of such a motor is that its speed can be controlled only by using a system including a sensor and servo-controlled loop. The same system is also necessary if it is desired to control the position of this motor. The use of such sensors and servo-controlled loops results in a very complex and very expensive motor, which counterbalances its basic advantages.

SUMMARY OF THE INVENTION

Thus, an object of the present invention is to provide a progressive surface acoustic wave motor whose speed and/or position can be directly controlled by a predetermined reference, without being necessary to provide speed or position sensors and associated servo-controlled loops.

To achieve these objects, the present invention provides a motor including two parts that are mobile one with respect to the other and have facing surfaces contacting each other, means associated with each part to produce on each facing surface progressive surface acoustic waves of the same direction, and control means for adjusting the relative frequency or phase of the progressive waves.

According to an embodiment of the present invention, the two mobile parts are substantially identical and have the same resonance acoustic frequency.

According to an embodiment of the invention, the progressive waves generated on the two parts have frequencies close to the resonance frequency.

According to an embodiment of the invention, the control means apply a predetermined phase difference with respect to a reference phase between the progressive waves applied to each of the two parts, whereby one of the parts moves by a predetermined distance with respect to the other.

According to an embodiment of the invention, the progressive waves generated on each of the two parts have distinct frequencies, close to the resonance frequency, whereby the rotation speed of one of the parts is predetermined with respect to the other.

According to an embodiment of the invention, the mobile parts are two coaxial rings with facing rims contacting each other.

According to an embodiment of the invention, the progressive waves are applied by piezoelectric ceramic portions constituting sectors of opposite polarities of a ceramic ring that is bonded on the surfaces of each part that is opposite to their contacting surfaces.

A further advantage of the motor according to the invention is that its torque is still higher than that of a conventional motor because the ripples simultaneously generated on the two parts can be considered as teeth of two cooperating gears. The risk that the mobile part may slide away from the fixed part is still reduced as compared with the conventional disposition.

The foregoing and other objects, features and advantages of the invention will become apparent from the following detailed description of the present invention when taken in conjunction with the accompanying drawings.

DETAILED DESCRIPTION

Figure 1:
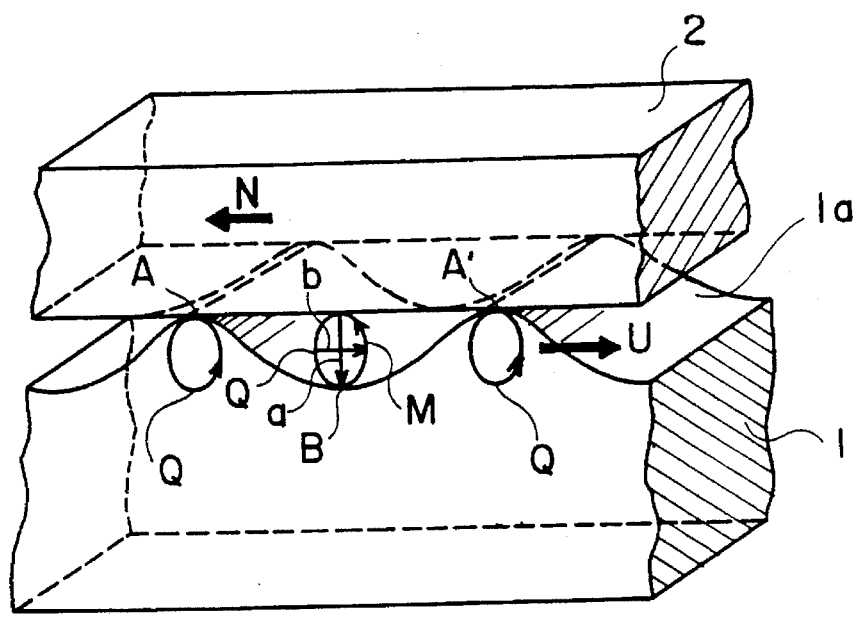
FIG. 1 schematically illustrates the principle on which a surface acoustic wave motor according to the prior art is based.
Figure 2:
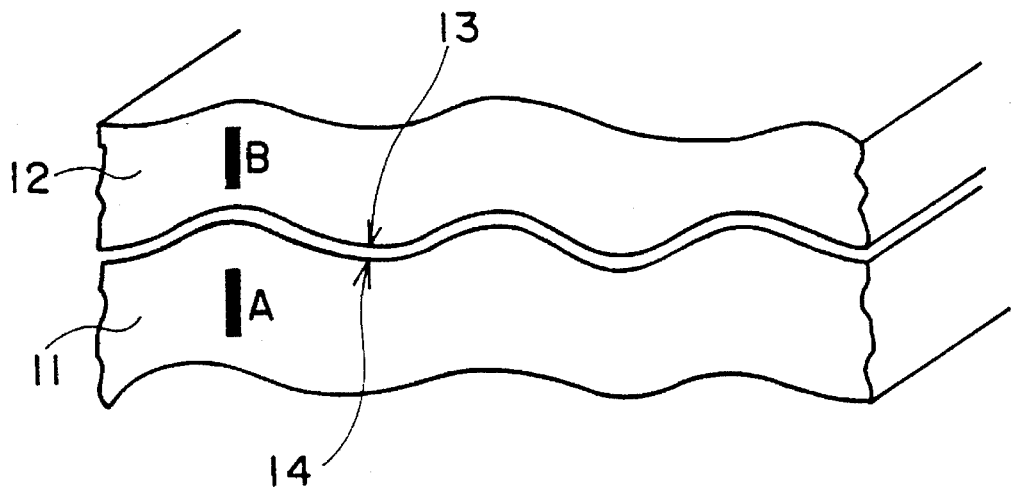
FIG. 2 schematically illustrates the principle on which a surface acoustic wave motor according to the invention is based.

FIG. 2 schematically illustrates the principle on which a motor assembly according to the invention is based. The motor assembly includes two parts, 11 and 12, one of which is mobile with respect to the other. Parts 11 and 12 have respective facing surfaces, 13 and 14. Each part 11 and 12 is acoustically excited in order to generate in the facing surfaces 13 and 14 progressive surface acoustic waves, more precisely, Lamb's waves having the same direction. The thickness of parts 11 and 12 being not too high with respect to the wavelength of the excitation signals. Thus, starting from a stop position at which a mark A of part 11 faces a mark B of part 12, and considering that the two progressive waves have the same frequency and same phase, parts 11 and 12 do not move one with respect to the other, and marks A and B remain in register.

If a phase shift $\phi$ is applied to the surface wave applied to part 12 with respect to the phase of the surface wave applied to part 11, one obtains a displacement $x=\lambda\phi/2\pi$ where $\lambda$ is the wavelength of the surface waves. Thus, one obtains a perfectly determined displacement that can, for example, provide a stepping motor or a positioning device.

If the phase of the progressive wave generated on part 12 continuously varies with respect to the phase of the progressive wave on part 11, that is, if the wave frequency $\omega'$ on part 12 is distinct by a value $\Delta\omega$ from the frequency of the surface wave on part 11, part 12 will move with respect to part 11 at a speed $v=\lambda\Delta\omega/2\pi$.

In a preferred embodiment of the present invention in which parts 11 and 12, as will be seen hereinafter, are rings that have rims pressed one against the other, a shift $\phi$ between the two waves causes an angular rotation by a value $\theta=\phi/n$ where n is the rank of the vibration mode excited on the two rings. Similarly, if surface waves having a frequency difference $\Delta\omega$ are applied on the circular parts, one of the parts will rotate with respect to the other at an angular frequency $\Omega=\Delta\omega/n$.

Figure 3:
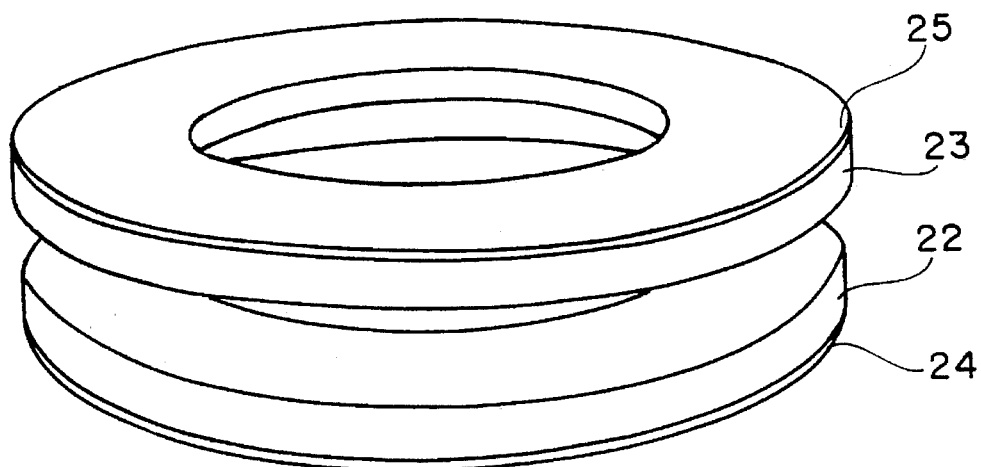
FIG. 3 schematically represents the shape of a motor of the axial type according to the invention.

FIG. 3 schematically represents an embodiment of a motor according to the invention. The motor includes a ring-shaped stator 22 and a ring-shaped rotor 23. Stator 22 and rotor 23 are constituted by parts that are substantially identical so that the surface acoustic waves have an equal resonance frequency. Piezoelectric elements, 24 and 25, designed for exciting a specific vibration resonance mode in the rings are respectively associated with rotor 23 and stator 22. Of course, as will be described hereinafter with reference to FIG. 5, means are provided for pressing rings 22 and 23 one against the other and for making ring 23 integral with an axis that allows its rotation with respect to ring 22.

The piezoelectric elements can be any conventional means such as those described, for example, in U.S. Pat. No. 4,562,374 mentioned above.

Figure 4:
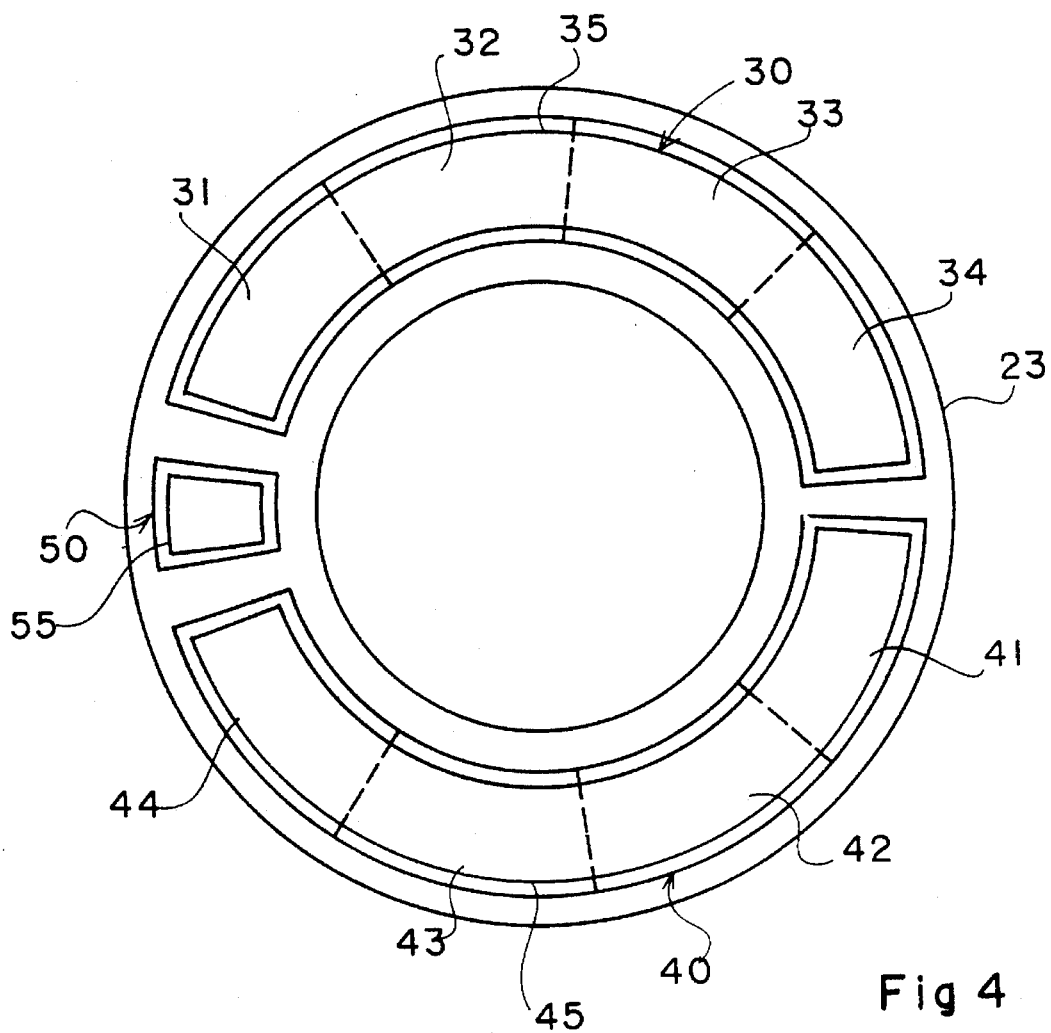
FIG. 4 represents an exemplary arrangement of an excitation piezoelectric ceramic for an armature of the motor of FIG. 3.

FIG. 4 represents an exemplary excitation system 25 associated with ring 23. The excitation system is constituted by a piezoelectric ceramic ring that is biased to form active sectors of either polarity, and neutral areas. A first set of sectors 30 substantially corresponds to one half of the ring surface, and a second set of sectors 40 substantially corresponds to the second half of the ring. Preferably, there is also provided an additional portion 50, corresponding to a small portion of the ring surface and intended for detecting vibrations. The sets 30 and 40 are respectively partitioned into a predetermined number of sectors, 31 to 34 and 41 to 44. Each sector has a polarity that is opposite to the polarity of the adjacent one, so that a voltage with a predetermined polarity between the two surfaces of two sectors having opposite polarities generates displacements in opposite direction, for example, a contraction for one sector and an expansion for the other. The apparent surface of the ceramic portion 30 is coated with a first electrode 35, the apparent surface of portion 40 is coated with a second electrode 45, and the apparent surface of portion 50 is coated with an electrode 55. A fourth electrode (not shown) constitutes the rear surface electrode of the three ceramics 30, 40, 50. Waves, shifted by 90° one with respect to the other, are applied between each electrode 35 and 45 and the rear surface electrode. The number and the surface of the sectors are selected to excite a predetermined vibration mode, provided that a suitable frequency is applied to the electrodes. For example, to excite the vibration mode 9, each sector of a given polarity substantially occupies 1:18 of the ring periphery.

The above description indicates that the piezoelectric elements are bonded to the motor rings 22 and 23. Any other way for applying an excitation system can be used, for example, piezoelectric ceramic layers deposited on the rings.

Figure 5:
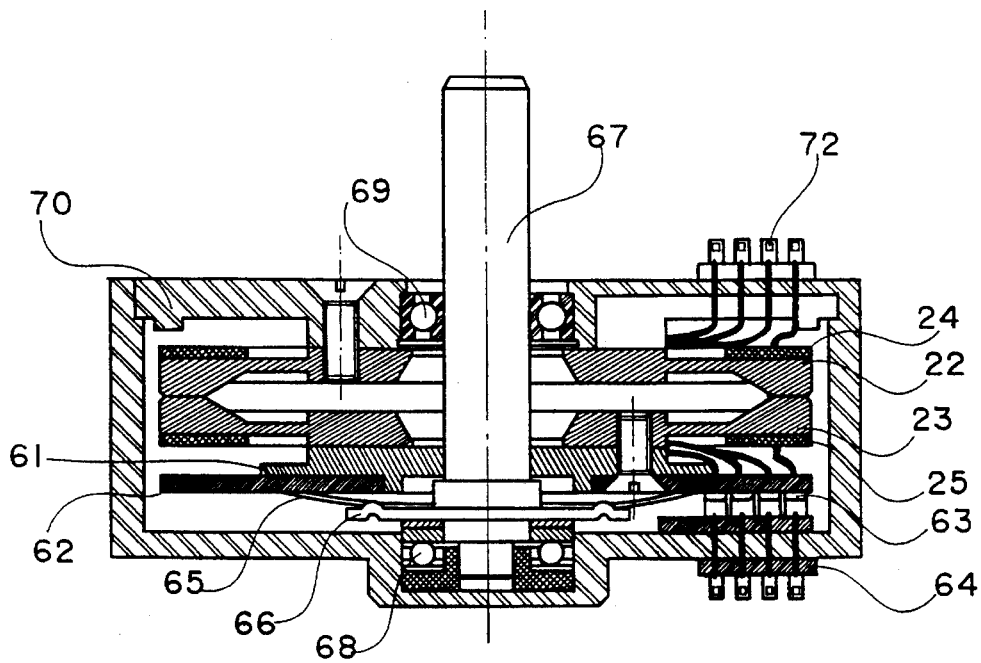
FIG. 5 represents an exemplary embodiment of a motor according to the invention.

FIG. 5 represents an axial cross-sectional view of an embodiment of a motor according to the invention and shows rotor 23 and stator 22 as well as their excitation piezoelectric ceramics, 24 and 25. Rotor 23 is fixed to a ring support 61 on which is mounted a supply plate 62 including sliding contacts 63 contacting corresponding contacts of a rotor connector 64. The rotor assembly is coupled, through an elastic compression element 65, to a driving ring 66 that is associated with the rotor shaft 67. Rotor shaft 67 rotates in rollers 68 and 69 of a frame 70 on which the stator ring 22 is mounted. Also, a connector 72 is associated with the excitation piezoelectric ceramics of the stator.

In addition, although this is not shown, the surfaces of the rotor and/or of the stator that are pressed together are coated for having a high friction factor. This coating must also be very hard. The rotor and stator rings are, for example, made or beryllium bronze.

Of course, FIG. 5 is only an exemplary embodiment of a motor according to the invention. It is preferred, as indicated above, to use a motor having an axial symmetry, in which the stator and rotor are also symmetrical with respect to a plane perpendicular to the motor's axis, in order to obtain a stator and a rotor having the same resonance frequencies. However, the invention can be adapted to systems excited by a peripheral rim, as indicated in the above U.S. Pat. No. 4,562,374, or can be adapted to linear systems.

In the above embodiment, the power supply of the piezoelectric excitation elements of the rotor is provided by a system including sliding contacts. Other systems can be advantageously used. For example, when the motor has to rotate by a portion of a turn only, or by a small number of turns, before it is made to rotate in the inverse direction, contacts to the rotor can merely be flexible wires. Also, since the excitation frequency of the piezoelectric ceramics is relatively high, for example, approximately 40 kHz (whereas, the rotation speed is fixed by the frequency difference between the rotor and the stator), a power supply through a rotating transformer can advantageously be used. Such a solution is incompatible with conventional motors for which the power supply frequency is associated by a factor (approximately from 2 to 10) with the rotation frequency, that is, the supply frequency is commonly approximately 20–100 Hz, which is incompatible with a satisfactory effectiveness of a small-size rotating transformer.

Those skilled in the art will be able to fabricate a system including an oscillator and phase shifters to control the structure according to the invention. A block diagram of such a power supply system is represented in FIG. 6.

Figure 6:
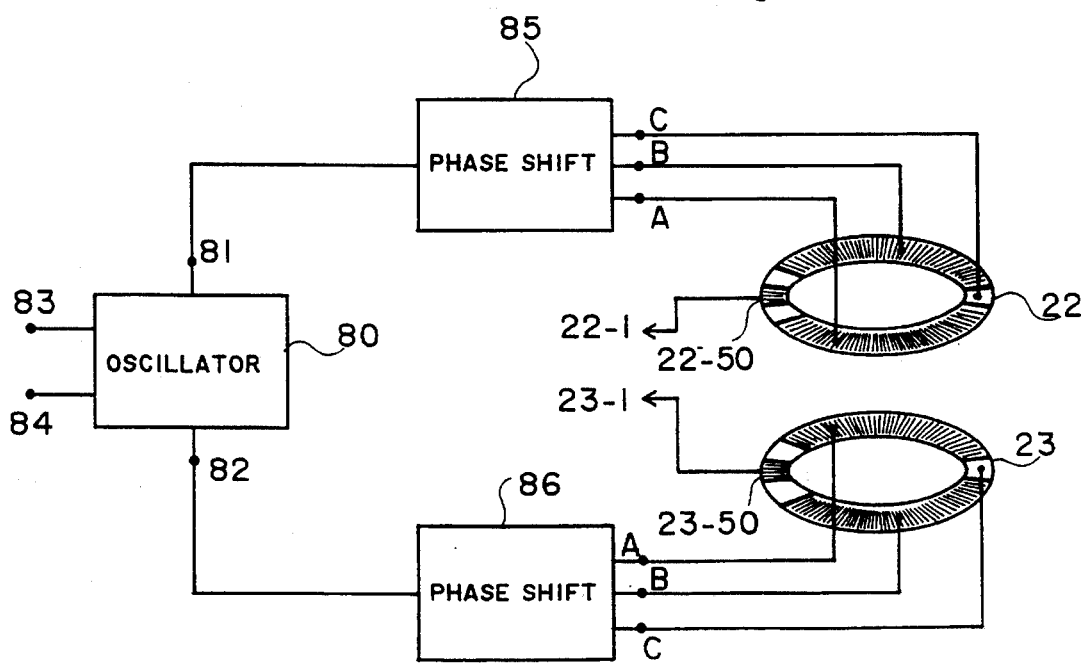
FIG. 6 schematically represents an embodiment of a method for controlling the motor according to the invention.

In FIG. 6, an oscillator 80 includes two outputs 81 and 82. In the absence of a control signal, outputs 81 and 82 are identical and correspond to a selected resonance mode for rings 22 and 23.

In the presence of a control signal at a position control terminal 83, a predetermined phase shift is applied at terminal 81 with respect to the oscillation phase at terminal 82 and, in the presence of a signal at a speed control terminal 84, the frequency of output 81 is shifted by $\Delta\omega$ with respect to the frequency at the output terminal 82. Each output 81 and 82 is provided to a phase-shifting and amplifying block, 85 and 86, respectively, that provides at outputs A and B signals shifted by 90° with respect to a reference terminal C. The shifted signals are applied to the piezoelectric ceramic sectors of stator 22 and rotor 23 in the way explained with reference to FIG. 4. As explained with reference to FIG. 4, each portion further includes a detection piezoelectric element, 22-50 and 23-50, respectively, that provide signals 22-1 and 23-1 characteristic of the amplitude of the surface waves of each ring. Signals 22-1 and 23-1 can be conventionally used to adjust the amplitude of amplifiers 85 and 86, or to adjust the central frequency of oscillator 80.

Figure 7:
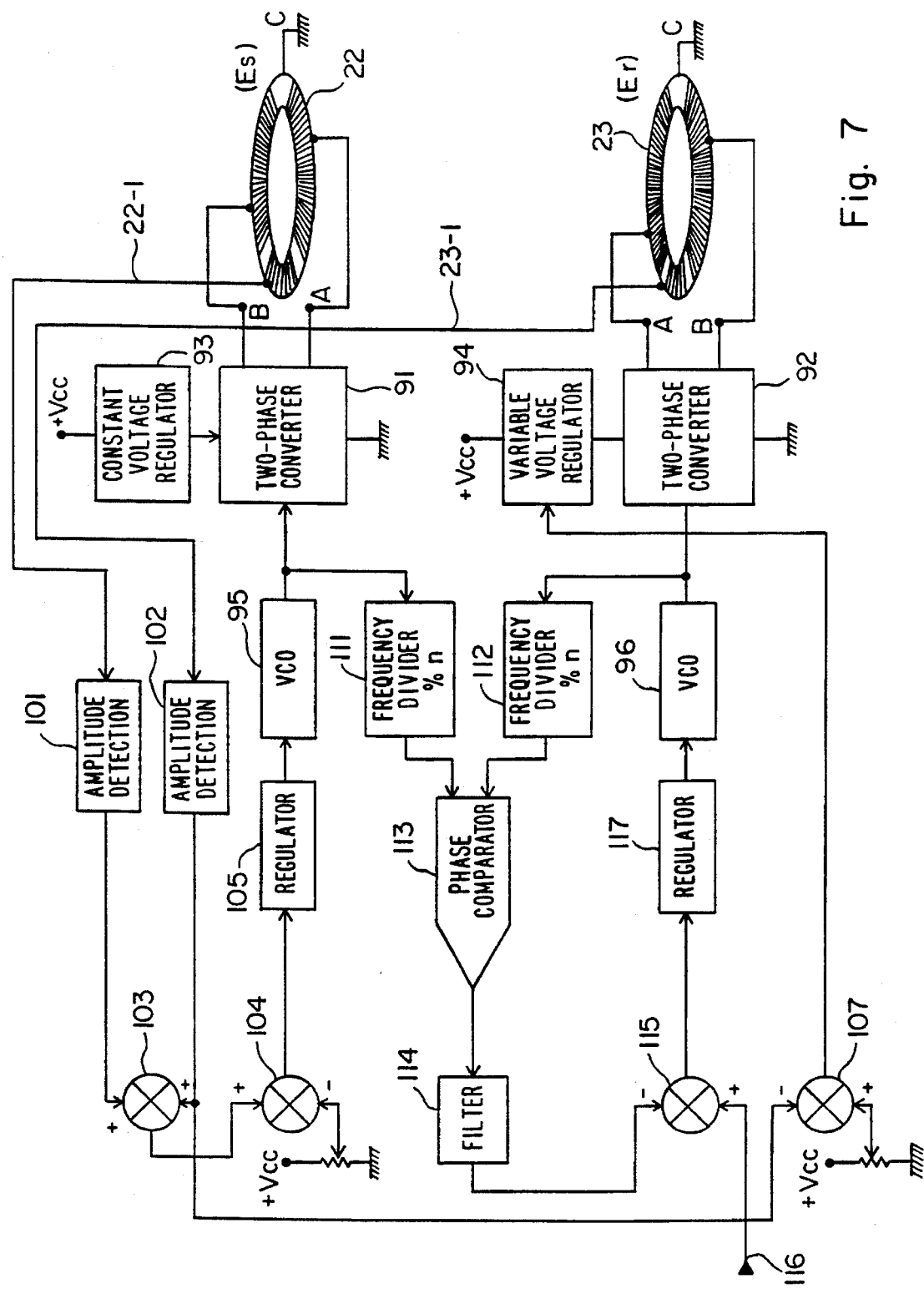
FIG. 7 is a more detailed representation of a control system for a motor according to the invention.

FIG. 7 represents in more detail an exemplary embodiment of a circuit for controlling a structure according to the invention. FIG. 7 shows again the control piezoelectric elements of stator 22 and rotor 23 that include respective control terminals A, B, and C, and terminals for providing the detection signals 22-1 and 23-1. The respective terminals A and B are fed by respective two-phase inverters, 91 and 92, that are connected to a d.c. supply voltage source +VCC through respective regulators 93 and 94. Preferably, regulator 93 is fixed and regulator 94 is adjustable. The two-phase inverters are respectively controlled by oscillators having their output frequency controlled by a voltage (VDD), 95 and 96, and that are controlled in the way that will be indicated hereinafter.

Signals 22-1 and 23-1 are provided to respective amplitude detectors, 101 and 102. An adder 103 provides the sum of the output signals of detectors 101 and 102. This sum is provided to a differential amplifier or subtracter 104 that subtracts a reference level therefrom. The difference or error signal is provided to a regulator 105 whose output controls oscillator 95.

The amplitude detector 102 has also an output that is provided to a subtracter 107 that subtracts a reference voltage therefrom to selectively control the regulator 94 controlling the amplitude of the two-phase inverter 92.

The output signals of oscillators 95 and 96 are respectively provided to frequency divide-by-n dividers 111 and 112, n being the rank of the excited vibration mode. The outputs of the signals divided by dividers 111 and 112 are applied to a phase comparator 113, whose output is applied through a filter 114 to a first input of a subtracter (or differential amplifier) 115, and.- whose other input, 116, receives a reference position signal. The output of the differential amplifier 115 is applied to the control terminal of oscillator 96 through a regulator 117.

Therefore, one obtains a motor according to the invention, whose position can be controlled by selecting the d.c. signal applied to terminal 116.

Thus, the invention achieves the desired objects, and the motor according to the invention has the following advantages:

excitation at a high frequency, therefore with a low noise, slow rotation speed, therefore not requiring the use of an attenuator, high hold torque, accurate positioning control, accurate speed control, low time constant, high driving torque, practically independent of the rotation speed.

I claim:

1. A surface acoustic wave motor including two parts that are mobile one with respect to the other, each part having a facing surface and a distant surface, said two parts being arranged with the facing surface of one part in direct and continuous contact with the facing surface of the other part, excitation means mounted on the distant surface of each part for acoustically exciting each part and for producing on each facing surface progressive surface acoustic waves of the same direction, and control means operationally connected to said excitation means for causing said excitation means to adjust the relative frequency or phase of said progressive waves.

2. The motor of claim 1, wherein said two parts are substantially identical and have the same resonance acoustic frequency.

3. The motor of claim 2, wherein the progressive waves generated on the two parts have frequencies close to said resonance frequency.

4. The motor of claim 3, wherein the control means apply a predetermined phase difference with respect to a reference phase between the progressive waves applied to each of the two parts, whereby one of the parts moves by a predetermined distance with respect to the other.

5. The motor of claim 2, wherein the progressive waves generated on each of said two parts have distinct frequencies, close to said resonance frequency, whereby the rotation speed of one of the parts is predetermined with respect to the other.

6. The motor of claim 1, wherein said mobile parts are two coaxial rings with facing rims contacting each other.

7. The motor of claim 1, wherein said excitation means comprises:

piezoelectric ceramic portions constituting sectors of opposite polarities of a ring bonded to each distant surface.

\* \* \* \* \*